Dec. 27, 1966 K. B. PARKER, JR., ET AL 3,295,140
MULTIPLE POINT RECORDER SYSTEM
Filed March 20, 1964 13 Sheets-Sheet 9

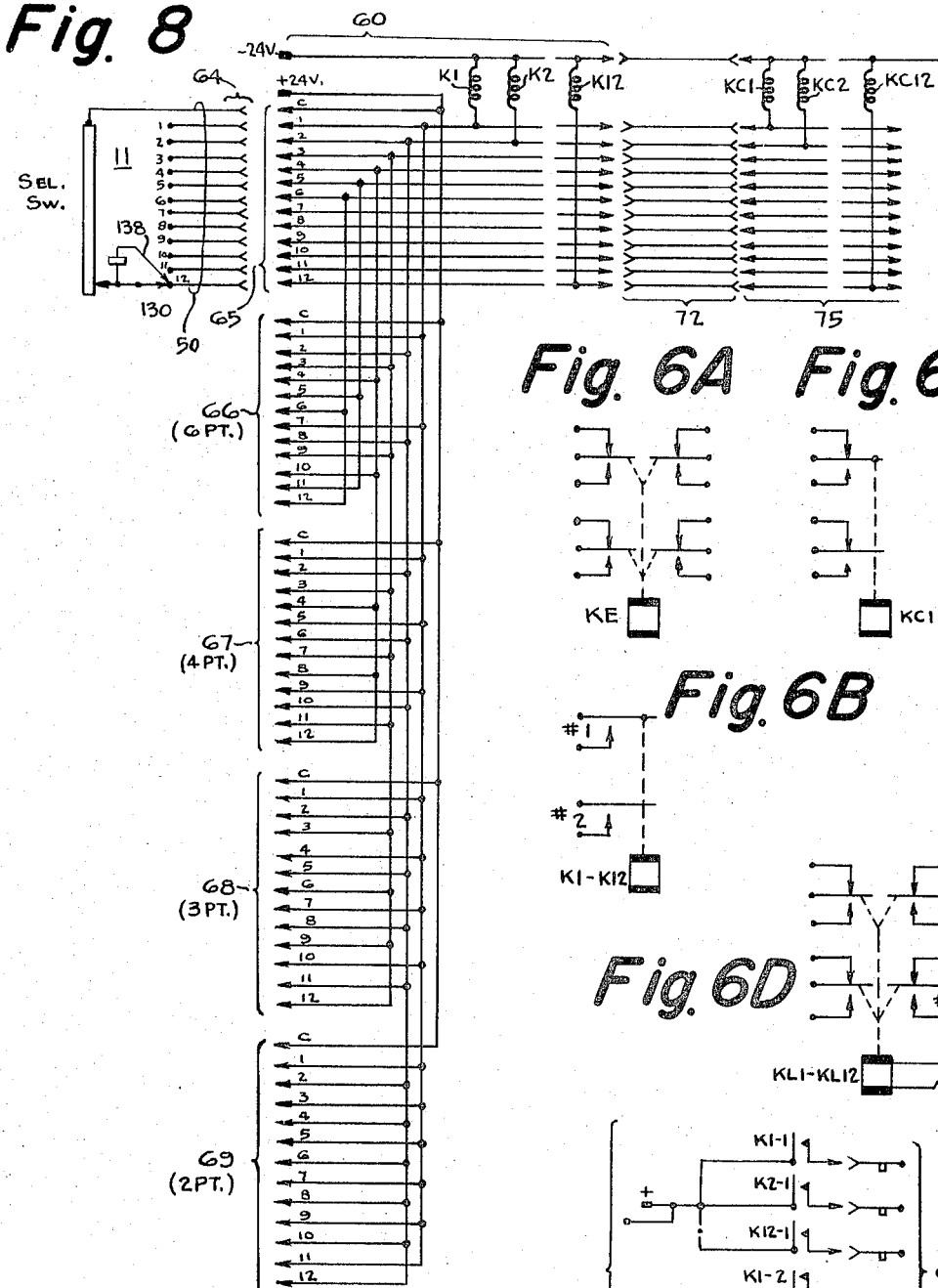
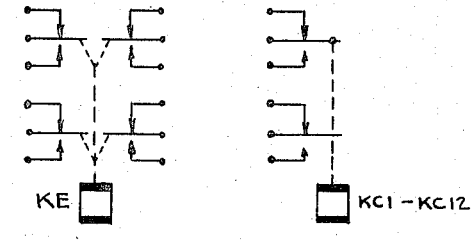
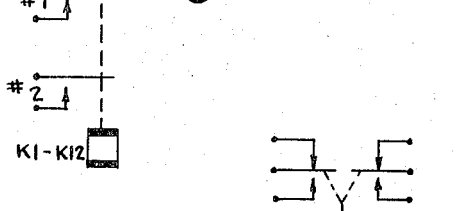
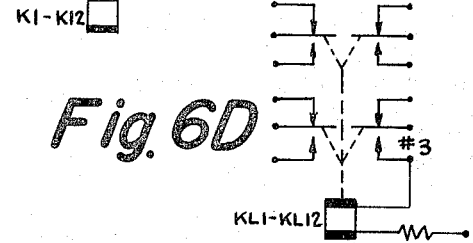
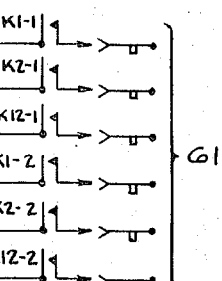
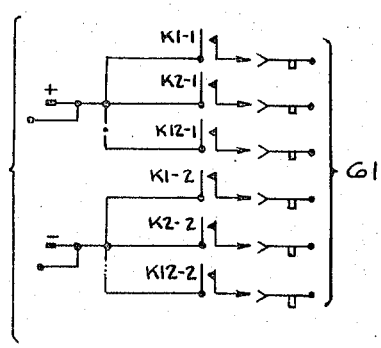

Dec. 27, 1966  K. B. PARKER, JR., ET AL  3,295,140
MULTIPLE POINT RECORDER SYSTEM
Filed March 20, 1964  13 Sheets-Sheet 12

3,295,140
MULTIPLE POINT RECORDER SYSTEM
Kenneth B. Parker, Jr., Norristown, and Albert E. Paschkis, Gwynedd Valley, Pa., assignors to Leeds & Northrup Company, a corporation of Pennsylvania
Filed Mar. 20, 1964, Ser. No. 353,382
24 Claims. (Cl. 346—34)

This invention relates to self-balancing multiple-point recorder systems, and particularly concerns switching arrangements for adapting such systems to installations having different operating requirements as to number and combination of measuring points, as to number and combination of set-points for control or alarm purposes, and for various types of control circuits.

In accordance with the present invention, the multiple inputs to be measured are switched in sequence into the measuring circuit of the recorder by relays of an input-selector which are selectively energized via a switch driven in synchronism with the print-drive mechanism of the recorder. The input-selector comprises a group of relays—in number corresponding with the maximum number, for example 12, which the recorder can print. These selector relays may be mounted on a printed circuit board having foil conductors which connect the relay coils to a group of foil terminals suited to accept a cable-terminal plug from the synchronizing switch for 12-point operation of the recorder. In addition, the input-selector card may be provided with a network of foil conductors connecting the relay coil to additional groups of plug-receiving terminals, for example four groups respectively corresponding with 6-point, 4-point, 3-point and 2-point operation of the recorder.

Also in accordance with the invention, the recorder system includes a group of control-commutator relays each connected for operation in unison with a corresponding input-selector relay. The contacts of the commutator relays may be used in association with one or more set-point switches of the recorder for controlling alarm or control circuits, generically termed load circuits, when a corresponding measurement point is alarmed (goes beyond set-point). The group of commutator relays may be mounted on a second printed-circuit board or card having for its coils a group of foil terminals which is engagable by the connector of a cable extending to the selector board.

Also in accordance with the invention, the recorder system includes a group of relays each of which is held in energized condition by a lock-in circuit when momentarily energized and which is unlocked or reset by interruption of the hold-in circuit or shunting of the relay coil. These lock-in relays may be used in association with the commutator relays and one or more of the set-point switches of the recorder to provide, for example, continued energization of an alarm, after a measuring point has been alarmed, until the corresponding lock-in relay has been reset manually or automatically; or to provide, for example, for continued energization of a load, after manual setting of the corersponding lock-in relay, until the corresponding measuring point becomes alarmed. The group of lock-in relays may be mounted on a third printed-circuit board or card having two groups of foil terminals respectively used for energization and deenergization of their coils and a third group of foil terminals receivable by a connection block of a chassis into which the selector and commutator cards may be similarly plugged.

Further in accordance with the invention, the problem of a false alarm on an incoming measuring point, because of an alarmed state on the previously measured point, is avoided by provision of an interrupter relay which precludes energization of the alarm circuit for the incoming measuring point until after the recorder has rebalanced to the new point.

Also in accordance with the invention, the recorder system may include a selector switch connected in series between the synchronizing switch and the 12-point position of the input-selector for converting the relay circuitry for 2, 3, 4, 6 or 12-point operation of the system and additionally providing for continuous monitoring of any one of the measuring points. For the different settings of the relatively movable contacts of this selector switch, they engage a corresponding segment of a printed circuit pattern; the different segments being coded by the foil inter-connections to effect operation of the corresponding input-selector, commutator and hold-in relays.

Also in accordance with the invention, the synchronizing switch is of construction which affords a rapid break-before-make transfer from one point to the other in avoidance of undesirable concurrent energization of the input-selector and the commutator relays. It may also include a dual movable contact whose segments are connected by a varistor or the like to suppress arcing during the switching from one to the next measuring point.

The invention further resides in the components and circuitry of a multiple-point recorder system having features of construction, combination and arrangement hereinafter described and claimed.

For a more detailed understanding of the invention, reference is made, in the following description of a preferred embodiment thereof, to the accompanying drawings in which:

FIG. 1 schematically illustrates a multi-point recorder system;

FIGS. 2A and 2B jointly provide a circuit schematic of components of the system of FIG. 1;

Figure 1:
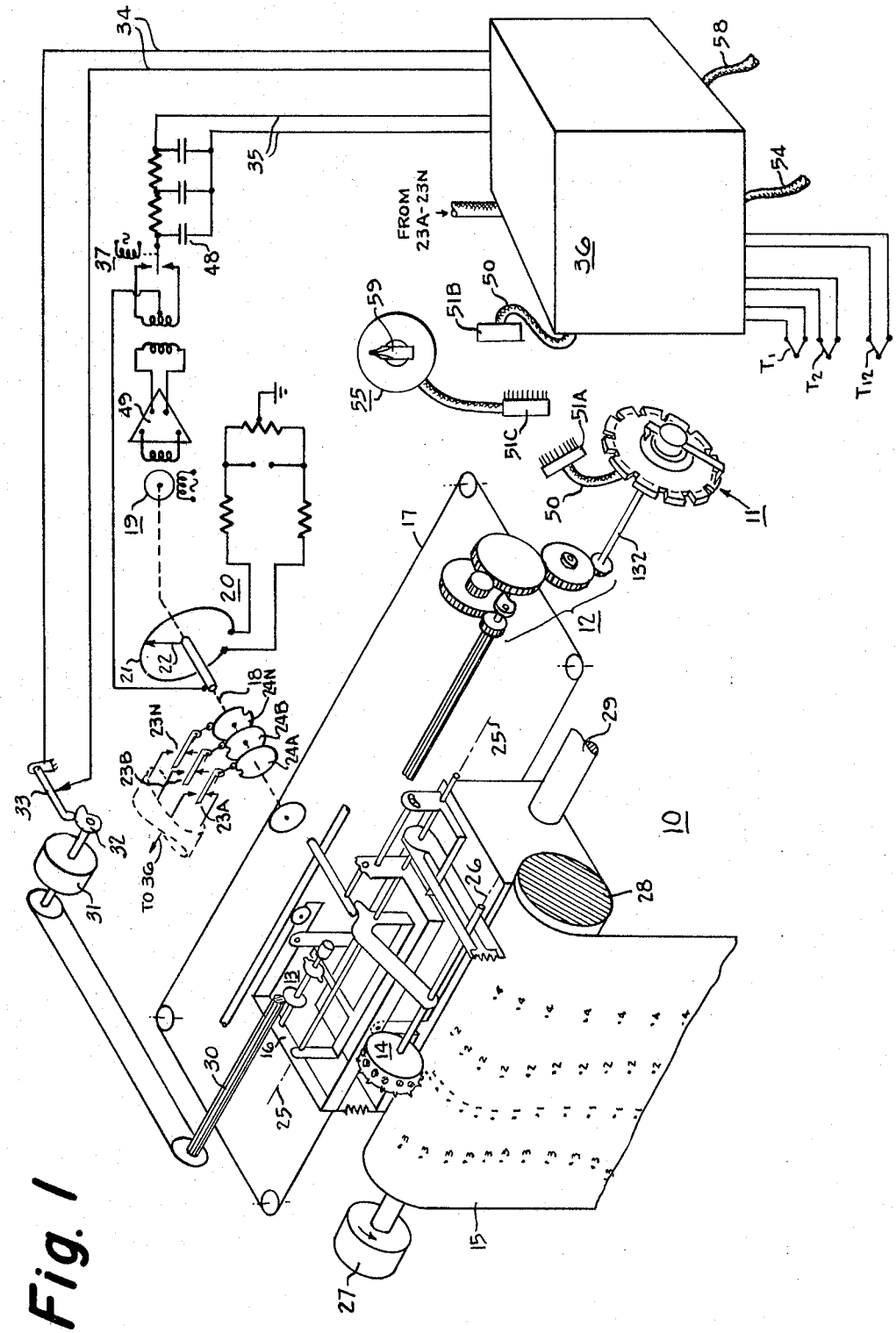
Figure 4:
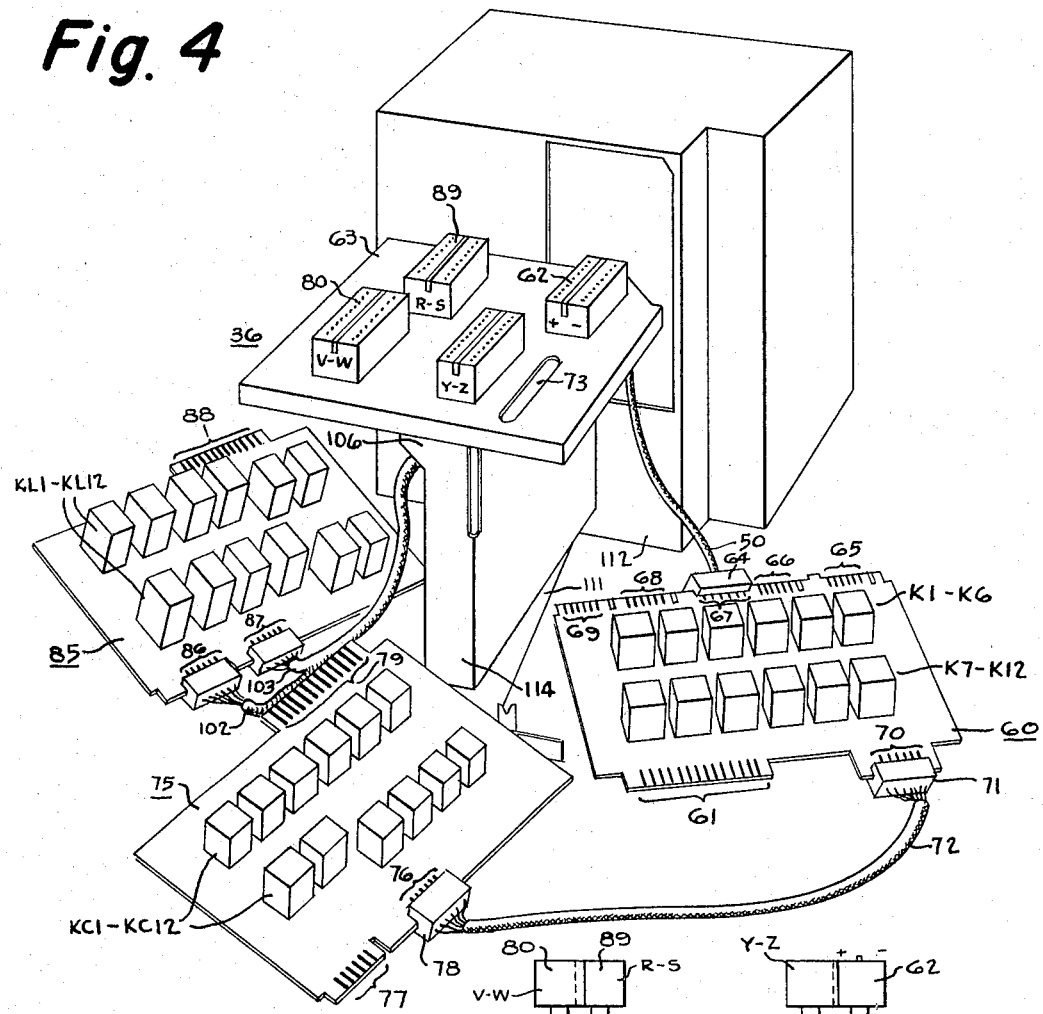
FIG. 4 is a perspective view of the unmounted circuit boards for the groups of input-switching, commutating and lock-in relays of FIG. 2A, the common mounting chassis including connection-blocks for the relays, and cables inter-connecting the relay boards and circuitry of the recorder. The chassis cover is not shown.
Figure 9:
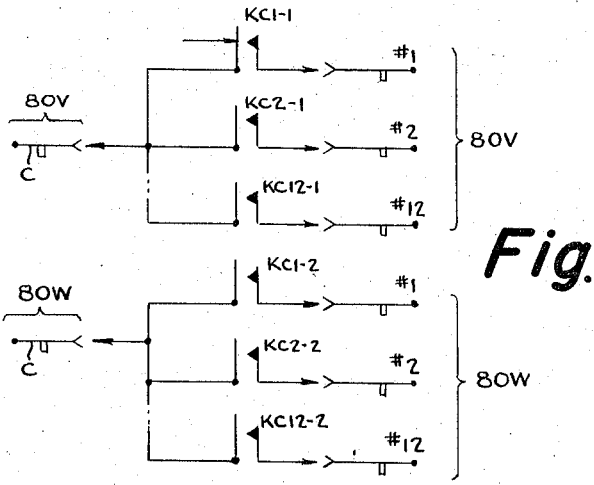
Figure 10:
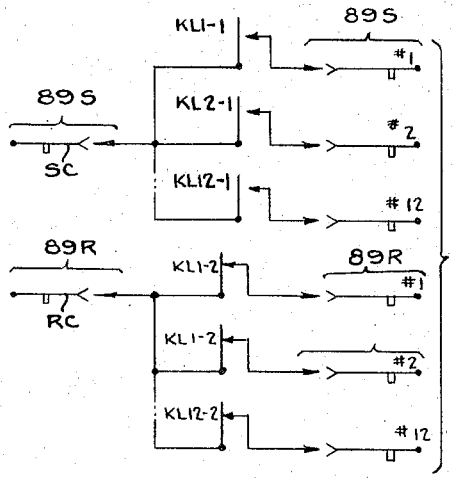
Figure 11:
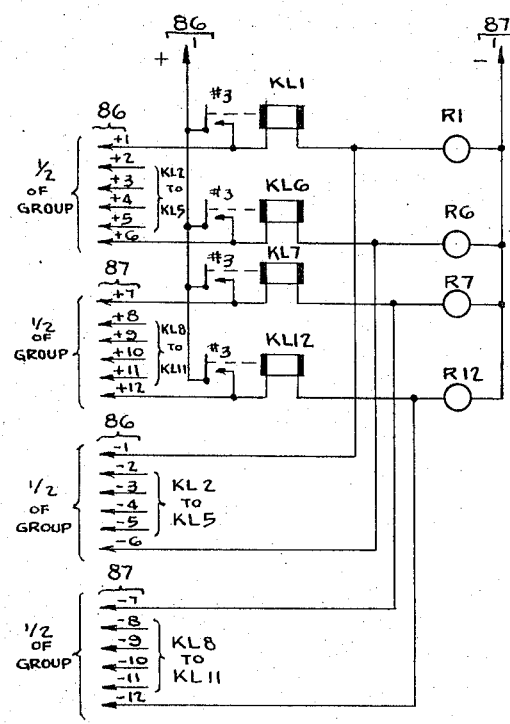
Figure 12:
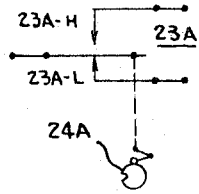
Figure 23A:
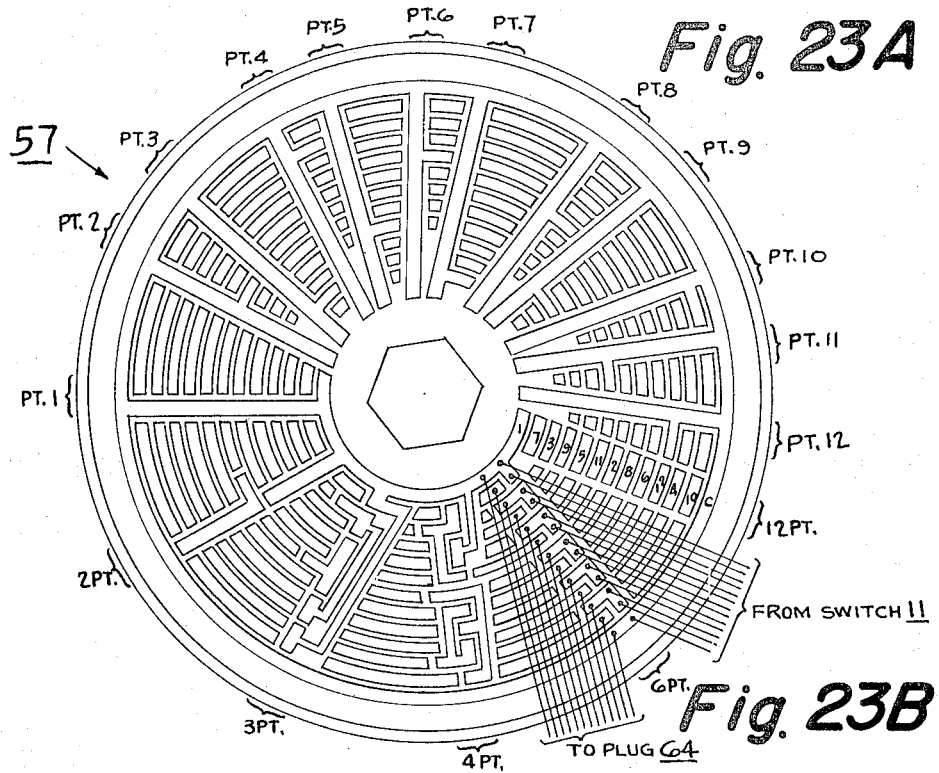
Figure 23B:
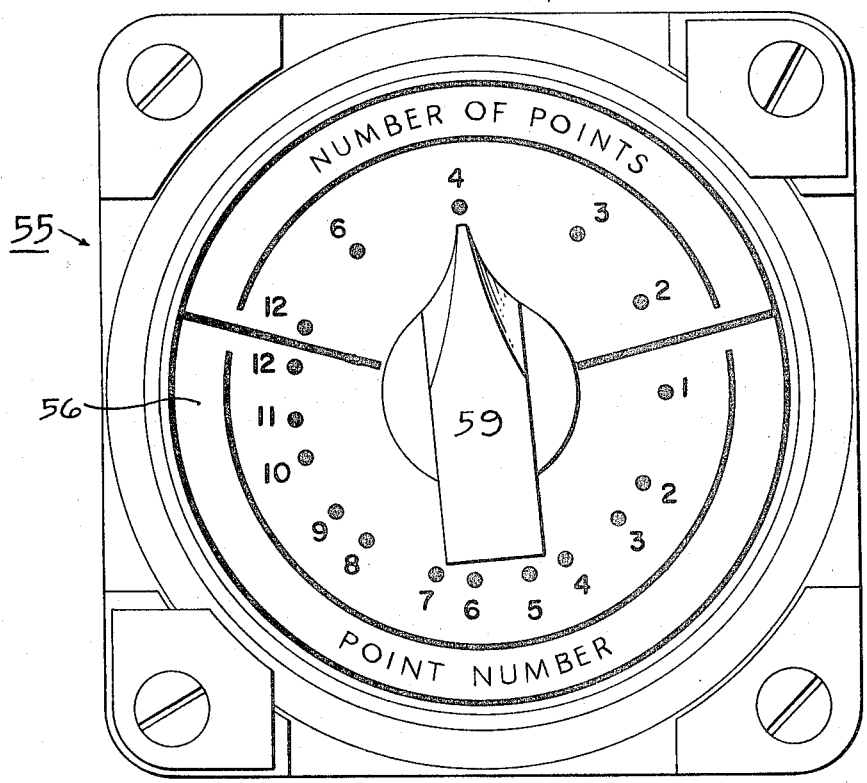
Figure 24:
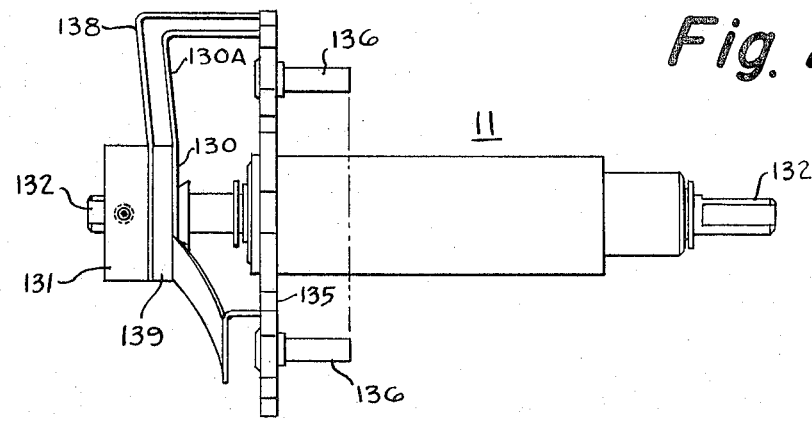
Figure 25:
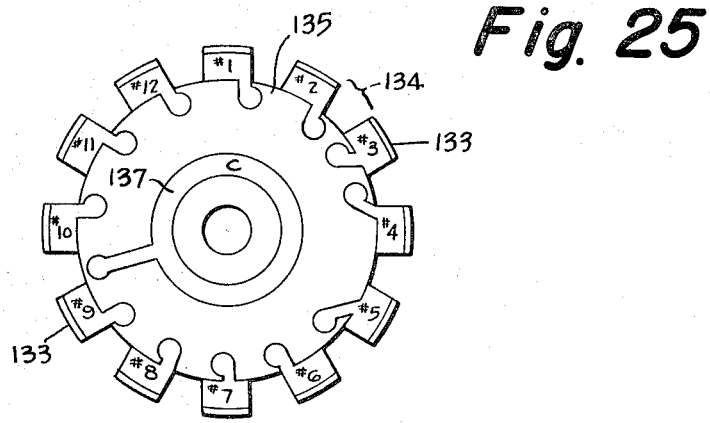

FIGS. 6A–6D respectively illustrate the four different types of relays used in the recorder system;

FIG. 7 schematically illustrates input-switching circuitry for connecting the transducers at the measuring points to the measuring circuit of the recorder;

FIG. 8 schematically illustrates the synchronizing switch of the recorder and the associated circuit network for energizing the input-switching relays and the control-commutator relays;

FIG. 9 schematically illustrates connections from contacts of the commutating relays to a connection block of FIG. 4;

FIG. 10 schematically illustrates connections from contacts of the lock-in relays to a connection block of FIG. 4;

FIG. 11 schematically illustrates connections from the coils of the lock-in relays to terminals of their circuit board;

FIGS. 12 to 22 illustrate various control circuit arrangements;

FIG. 23A shows the printed circuit board of the manually-operable selector switch of FIG. 1;

FIG. 23B shows the operating knob and dial of the selector switch;

FIG. 24 is a side elevational view of the synchronizing switch of FIG. 1;

FIG. 25 is a front view of the contact wafer of FIG. 24; and

Figure 26:
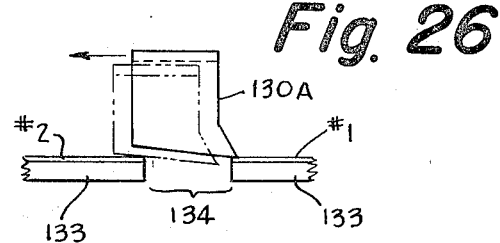

FIG. 26 is an explanatory figure referred to in discussion of FIGS. 24 and 25.

Figure 2A:
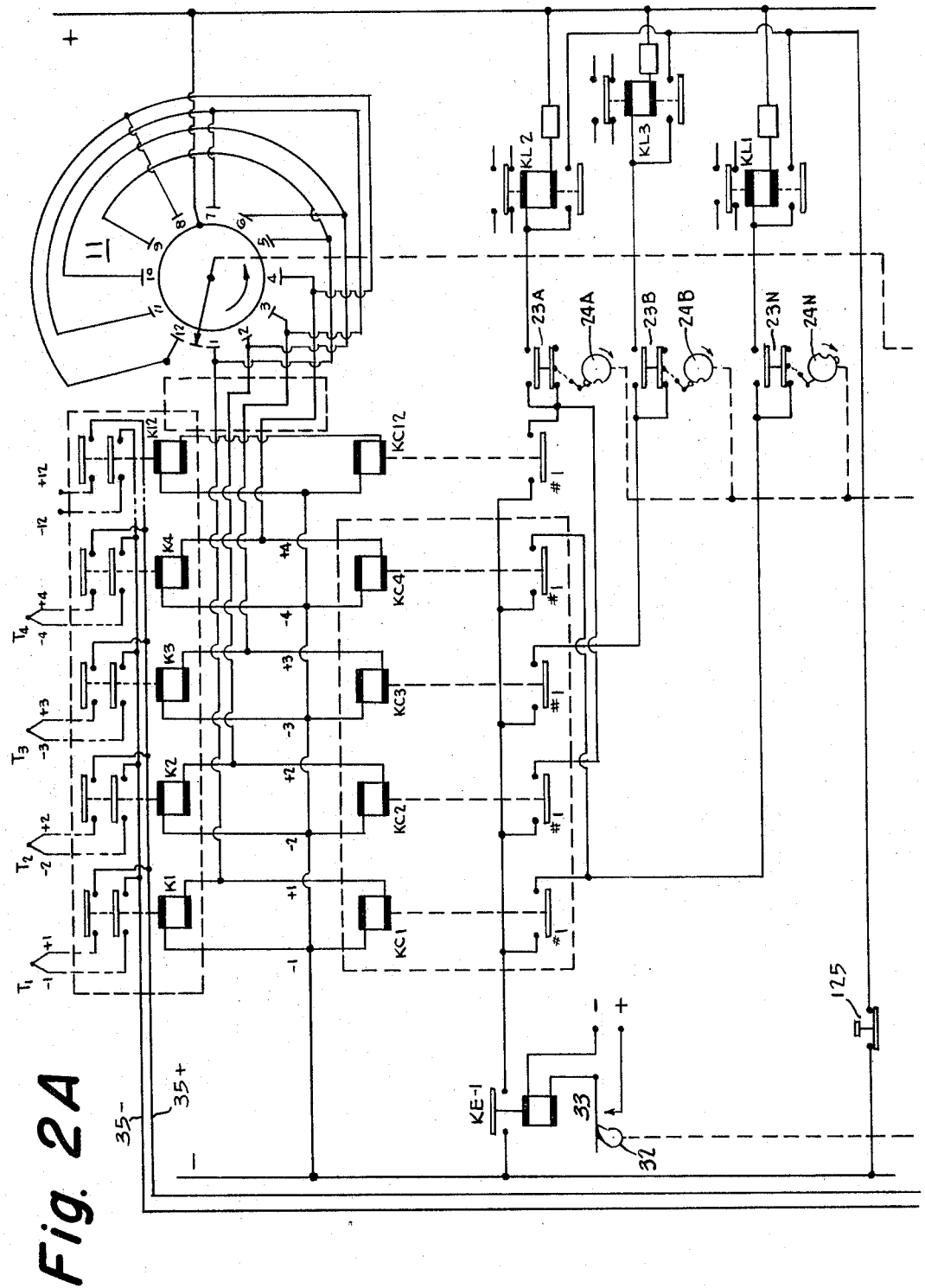
Figure 2B:
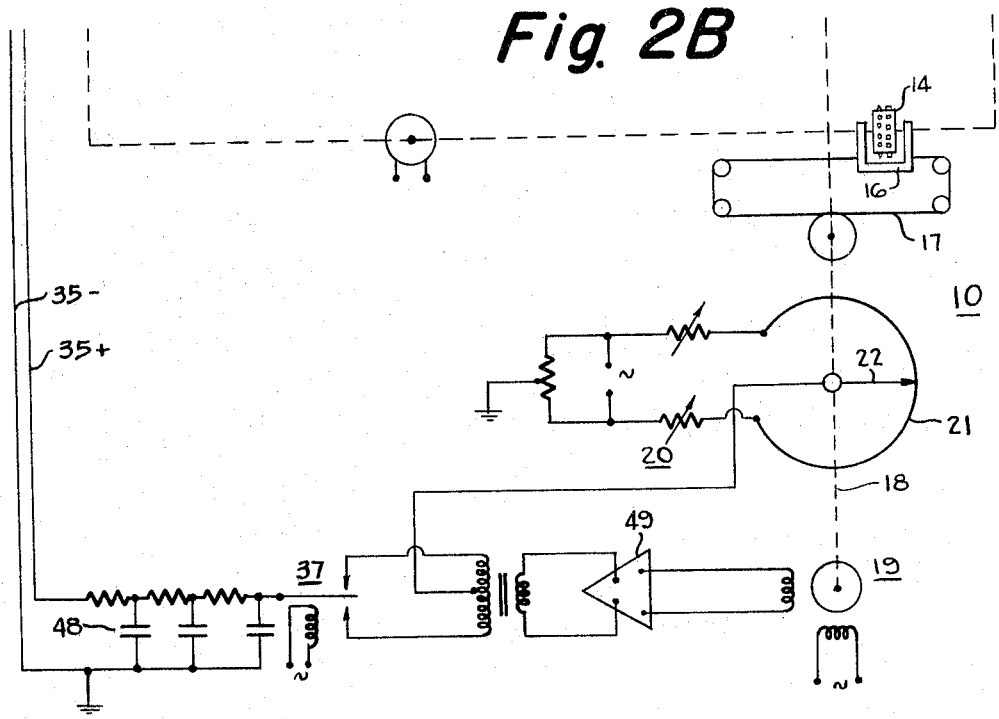

Referring to FIGS. 1, 2A and 2B, the multiple-point recorder system therein shown comprises a multiple-point recorder 10 having a multi-point switch 11 driven in synchronism, by gearing 12, with the mechanism 13 which advances the print wheel 14 of the recorder in turn to present the successive characters thereon to the recorder chart 15. The carriage 16 for the print wheel is coupled, as by cord 17 and shaft 18, to the rebalancing motor 19 of the recorder. In the interval between successive printing operations, one of the multiple inputs of the system produced by transducers $T_1$–$T_{12}$ is introduced into the measuring circuit 20 of the recorder. In the system shown, the measuring circuit includes a slidewire 21 having a relatively adjustable contact 22. Any resulting unbalance signal is effective to energize motor 19 in sense to restore the measuring circuit to balance by relative adjustment of the slidewire and its contact and to move the print wheel 14 transversely of chart 15 to a position corresponding with the measured value of the variable to which the transducer then in circuit is responsive.

The recorder 10 also includes one or more set-point switches 23A–23N preset to shift their circuit-controlling state when the measured value of one or more of the inputs to the recorder either rises above or falls below predetermined high or low magnitudes respectively. In the form shown, these switches are respectively operated by cams 24A–24N on the slidewire shaft 18, and the cam-follower mechanism may be of the type shown in U.S. Letters Patent 2,096,064.

Although the invention herein claimed is not limited thereto, the multi-point recorder specifically herein shown is of construction disclosed and claimed in copending application Serial No. 277,995 (Patent 3,195,141) to which reference may be had for a more detailed discussion of the mechanism 13 which periodically rocks the print wheel 14 about axis 25—25 to engage the chart and advances the print wheel 14 about its axis of rotation 26 sequentially to present the point-identification characters. It should here suffice additionally to note that the chart 15 shown is a strip-chart continuously driven by motor 27 via the feed roll 28 whose axis is parallel to the guide bar 29 for the print-wheel carriage 16 and that the elongated pinion 30 which provides the drive for the multi-point switch 11 and the printing mechanism 13 is continuously driven by motor 31.

For purposes of the present invention, the motor 31 also drives the operating cam 32 of an interrupter switch 33. The leads 34 from this switch extend to the relay within box 36 (FIGS. 1, 4, 5) as do also the cabled leads from the control switches 23A–23N, and the leads 35 from theh filter 48 in the input circuit of the unbalance amplifier 49 (FIGS. 1, 2B). The synchronous converter 37 in the measuring circuitry converts the D.C. unbalance voltage into unidirectional pulses of polarity dependent upon the sense of unbalance and of magnitude corresponding to the extent of balance. These pulses, as amplified by amplifier 49, provide the excitation for one winding of the balancing motor 19: the other motor winding is excited by A.C. from the same source which drives the synchronous converter 37 and provides current to the measuring slidewire 21 (FIG. 2B). The leads from the synchronizing switch 11 are included in the cable 50 (FIGS. 1, 4) which extends to the switching unit 36 which is attached to, or remote from, the recorder housing. This cable may include mating connectors 51A, 51B which can be separated to interpose a connector 51C for inclusion of a manually-operable selector switch 55 (FIGS. 1, 23A) having purposes hereinafter described. The leads from the transducers $T_1$ et seq. at the measuring points are connected to terminal block 62 (FIG. 4) of the switching unit 36. The cable 54 from the switching unit 36 is for connection to one or more manually-operable reset switches later herein discussed: the cable 58 is for connection to external load circuits.

The array of relays in the switching unit 36 (FIGS. 4, 5) includes a group of input-selector relays K1, K2 et seq. a group of control-commutator relays KC1, KL2 et seq. a group of lock-in relays KL1, KL2 et seq. For a twelve-point recorder, for example, there are twelve input-selector relays, and depending upon the desired control circuitry, there may be as many as twelve commutator relays and twelve lock-in relays. The array also includes an interrupter relay KE.

The contacts of relay KE provide four 1-pole, double-throw switches (FIG. 6A) which are each shifted from one to another of their circuit-controlling positions upon energization or deenergization of the relay coil. The contacts of each of the input-selector relays K1 et seq provide two 1-pole single-throw switches (FIG. 6B) which are open when the relay coil is deenergized and which are closed when the relay coil is energized. The contacts of each of the commutator relays KC1–KC12 provide two single-pole, double-throw switches (FIG. 6C) which are each shifted from one to another of their circuit-controlling positions upon energization or deenergization of the relay coil. The contacts of each of the lock-in relays provide four 1-pole, double-throw switches (FIG. 6D), one of which (#3) completes a hold-in circuit for the relay coil and each of which shifts its circuit-controlling position when the relay coil is energized or deenergized.

The relays K1–K12 are mounted, by their plug-in connections, upon the printed-circuit board or card 60 (FIGS. 4, 5) whose foil circuitry provides the connections from the relay coils and contacts to groups of foil terminals spaced along the upper and lower edges of the card. The group 61 of twenty-eight terminals along the upper edge of the card 60 (fourteen on each side) is detachably received by the connector block 62 attached to the horizontal or top plate 63 of the chassis of unit 36. With the card 60 in mounted position, FIG. 5, one set of the normally-open contacts K1–1 through K12–1 of the input-selector relays K1–K12 is respectively connected between the +1 through +12 contacts of the connector block 62 and the common positive and C contacts of that block; and a second set of the normally-open contacts of switches K1–2 through K12–2 of those relays is respectively connected between the —1 through —12 contacts of the block 62 and its common negative and C contacts (FIG. 7). The +C and —C contacts of the connection block 62 are connected via the leads 35, 35 to the measuring circuit (FIGS. 1 and 2A, 2B): the +1 to +12 contacts of the block 62 are connected to the positive leads of the transducers at the measuring points and the —1 to —12 contacts of that block are connected to the negative leads of those transducers. The remaining pair of terminals of group 61 are for connection, via connector block 62, to the power source for the relay coils.

Along the lower edge of the input-selector card 60 (FIG. 4) are five groups (65–69) of thirteen foil terminals. Any one of these groups may be selected to mate with the connector plug 64 of the cable 50 from the syn chronizing switch 11. The foil interconnections between the card terminals of these five groups provide a networl providing for 12-point, 6-point, 4-point, 3-point, or 2-point operation of the recorder. Specifically, when the synchronizing switch plug 64 is pushed onto the input-selector card 60 in position for engagement of its contacts with the group 65 of selector terminals (FIGS. 4, 8), the twelve points (1–12) of the cynchronizing switch 11 are respectively connected to the correspondingly numbered conductors of the selector. Thus, for each cycle or revolution of the synchronizing switch 11, the coils of input-selector relays K1–K12 are each in turn sequentially energized for a period (FIG. 8) during which the recorder effects a measurement for the corresponding point.

When the plug 64 is pushed into position to engage the group 66 of selector-card terminals, six relay coils (K1–K6) are connected to the synchronizing switch 11 each via a pair of the foil conductors (i.e., 1, 7: 2, 8: 3, 9: 4, 10: 5, 11: 6, 12). In consequence, for each cycle of the synchronizing switch 11, the coils of the input-selector relays K1–K6 are each in turn sequentially energized for a period (the sequence repeating twice for the switch cycle) during which its switches are closed to connect the measuring circuit of the recorder to one of the transducers $T_1$–$T_6$ via its connections to the terminal block 62.

When the plug 64 is pushed into position to engage the group 67 (FIG. 4) of the selector-card terminals, four relay coils K1–K4 are connected to the synchronizing switch 11, each of three of foil conductors (i.e., 1, 5, 9: 2, 6, 10: 3, 7, 11: 4, 8, 12). In consequence, for each cycle of synchronizing switch 11, the coils of the input-selector relays K1–K4 are each in turn sequentially energized (the sequence repeated three times for the switch cycle) during which its switches are closed to connect the measuring circuit to one of the transducers $T_1$–$T_4$ (see FIG. 2A) via its connections to the terminal block 62.

With plug 64 in position to engage the group 68 of the selector-card terminals, three relay coils (K1–K3) are connected to the synchronizing switch 11 (each to four of the foil conductors (i.e., 1, 4, 7, 10: 2, 5, 8, 11: 3, 6, 9, 12)). In consequence for each cycle of the synchronizing switch 11, the coils of the input-selector relays K1–K3 are each in turn sequentially energized to include one of the transducers $T_1$–$T_3$ in the measuring circuit, the sequence repeating four times for each scanning cycle of switch 11.

Similarly, with plug 64 in position to engage group 69 of the selector-card terminals, two relay coils (K1–K2) are connected to the synchronizing switch, each to six of the conductors (i.e., 1, 3, 5, 7, 9, 11: 2, 4, 6, 8, 10, 12) of the foil network. Consequently, for each cycle of switch 11, the coils of input-selector relays K1, K2 are alternately energized to include first one and then the other of transducers $T_1$, $T_2$ in the measuring circuit, this sequence repeating six times for each cycle of switch 11. It is to be noted that in each case the conversion of the number of measured points is accomplished in the high level circuitry of the relay coils rather than in the low level circuitry including the transducers. This minimizes the number of connections in the low level circuits where each connection may produce contact-potential and resistance effects whose characteristics are significant in low-level circuits, such as exemplified in the circuitry of transducers $T_1$–$T_{12}$, but are of little or no consequence in high-level circuits such as the coil circuits of the selector relays K1–K12: and avoids the need to use thermocouple-extension lead wire in the point-selection network. Such special wire is not only expensive but is different for every different type of thermocouple.

The second group 70 of foil terminals on the upper edge of the selector card is for receiving the plug 71 of transfer cable 72 (FIGS. 4, 8), which plugs onto the commutating-relay card 75 whose printed foil circuitry provides the connections from the coils and contacts of the commutating-relays KC1–KC12 to groups of foil terminals along the upper and lower edges of the card 75. The slot 73 in the top plate 63 of the relay chassis permits the tab of selector card 60 to extend therethrough so that the cable plug 71 may be connected to the terminal group 70 when the card 60 is mounted in the chassis.

The two groups 76, 77 of foil terminals at the lower edge of the commutator card 75 (FIG. 4) are each suited to receive the plug 78 of the transfer cable 72 so to connect the coils of control commutator relays KC1–KC12 respectively in parallel with the coils of the input-selector relays K1–K12 (FIGS. 2A, 8). Thus, with the plug 50 inserted in the "12-point" position on selector card 60, the relays KC1–KC12 will be energized in sequence for each cycle of synchronizing switch 11 of the recorder 10: with the plug 50 inserted in the "6-point" position of selector card 60, the relays KC1–KC6 will be sequentially energized twice in each cycle of switch 11: with plug 50 in the "4-point" position on card 60, the relays KC1–KC4 will be sequentially energized three times in each cycle of switch 11: with plug 50 in the "3-point" position on card 60, the relays KC1–KC3 will be sequentially energized four times in each cycle of switch 11: and with plug 50 in the "2-point" position on selector card 60, the relays KC1–KC2 will be sequentially energized six times in each cycle of switch 11. In short, conversion from 12 to 6, 4, 3, or 2-point operation on the input-selector automatically converts the operation of the control commutator to the proper number of points.

Connections from the normally-open contacts of relays KC1–KC12 to the group 79 of foil terminals on the upper edge tab of card 75 are provided by its printed circuitry. Thus, when the commutator card 75 is plugged into the terminal block 80 (FIG. 4) on the upper plate 63 of the chassis, the contacts of these relays are connected to the two rows of contacts (1W–13W: 1V–13V) of the terminal block 80 (FIGS. 4, 9) for connection into control or alarm ciruits such as later herein discussed. Provision is also made on the card 75 to make connections to the normally-closed contacts of relays KC1–KC12.

The hold-in relays KL1–KL12 and associated current-limiting resistors R1 to R12 are mounted on the printed circuit board 85 whose foil circuitry provides connections from the relay coils and the relay contacts to groups 86, 87, 88 of foil terminals on the upper and lower edges of the card. The group 88 on the tab extension of the upper edges of card 85 consists of two sets of thirteen contacts on each side of the tab. With the card 85 plugged into the terminal block 89 on the top plate of the chassis, one set of thirteen contacts of card 85 engages corresponding S contacts of the terminal block 89 (FIG. 10) to connect the normally-open contacts KL1–1—KL12–1 of the lock-in relays KL1–KL12 between the SC common contact and the S1–S12 contacts of the terminal block 89 for connection into alarm or control circuits: the other set of thirteen contacts of card 85 engages corresponding R contacts of the terminal block 89 to connect the normally-closed contacts KL1–2—KL12–2 of the lock-in relays KL1–KL12 between the RC common and the R1–R12 of terminal block 89 for connection into alarm or control circuits. Six of the terminals of group 86 are on one side of the board and are for energizing relay coils KL1–KL6, six other terminals of this group are on the other side of the board and are for deenergizing the relays KL1–KL6. The thirteenth terminal of group 86 is for connection to the power supply for the relays. Similarly, the terminals of group 87 are for energization and deenergization of relays KL7–KL12 and for connection to the power supply.

The foil circuitry of the card also provides that the normally-open #3 contacts of each relay KL1–KL12 are closed (FIG. 6D) upon energization of that relay to complete a hold-in circuit so electrically to hold all contacts of the relay in position corresponding with the ON-state of the relay until either power is removed from the hold-in circuit or the relay coil is by-passed or shorted. Various manual and automatic energization and deenergization circuits are later herein discussed: they include conductors in one or the other or both of the cables 102, 103 which are detachably received by the foil terminal groups 86, 87 of the hold-in relay card 85. The far end of the conductors of cables 102, 103 may be connected in various ways to effect various control circuit arrangements including those later described.

Upon the vertical plate 106 of the relay chassis 36 is mounted the interrupter relay KE (FIG. 5) whose coil is periodically energized by the interrupter switch 33 (FIGS. 1, 2A, 2B) of the recorder 10. This switch is so timed that the relay KE is not energized when the movable contact of the synchronizing switch 11 first engages any one of its fixed contacts or points and remains deenergized until after the measuring circuit has had time to come to balance for that point.

Figure 3:
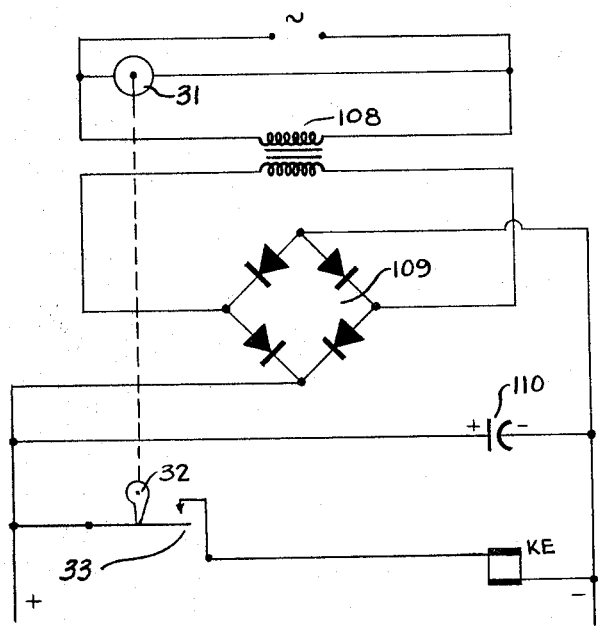
FIG. 3 is the circuit diagram of a suitable power supply for relays of the system of FIG. 1.
Figure 5:
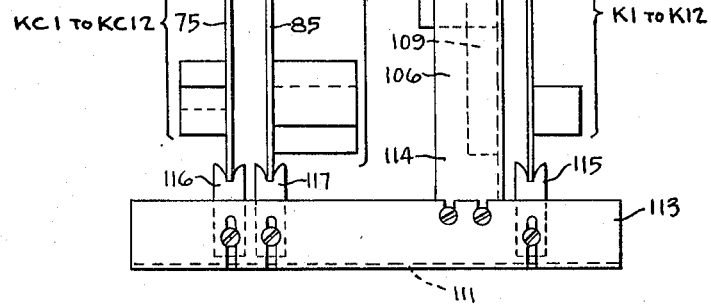
FIG. 5 is an end elevational view showing the relay boards in their normal mounted position.

The components of the power supply which provide DC excitation for all of the relays KE, K1–KC12 and KL1–KL12 may also be mounted on plate 106 of the chassis 36 (FIG. 5). This supply includes the step-down transformer 108, the solid-state full-wave bridge rectifier 109 and filter capacitor 110 (FIG. 3) if used.

The bottom plate 111 of the chassis is detachably hinged to vertical back plate 112 (FIGS. 4, 5), passes under the lower edges of the printed circuit boards 60, 75, 85 as mounted in the chassis, and its upturned front lip 113 is slotted to pass the clamping screws which are threaded into the front lip 114 of the vertical plate 106. The spring-clips 115–117 (FIG. 5) are adjustably clamped as by screws to the lip 113 of the bottom plate 111. The forked upper edges of these clips respectively engage and support the printed circuit relay cards 60, 75 and 85.

FIGS. 12 to 22 are exemplary of various load control and/or alarm circuit arrangements possible with the control circuitry afforded by the recorder 10 and the relay array above described. A brief description thereof follows.

In FIGS. 12–22, as shown, the H contacts of one or more of the set-point switches 23A–23N are closed when the measured quantity is between set-point and the right end of the record scale (generally above set-point) and the L contacts of one or more of the set-point switches are closed when the measured quantity is between set-point and the left end of the scale (generally below set-point).

When all measuring points of a particular installation have a common set-point, one of the cam-operated switches 23A–23N itself provides the required control circuit switching (FIG. 12), using the H or L contacts or both. The input-selector relays K1–K12 under control of the synchronizing switch 11 provide, as above described, the input-switching for recorder or recorder-controller systems having 12, 6, 4, 3 or 2 measuring points.

Figure 13:
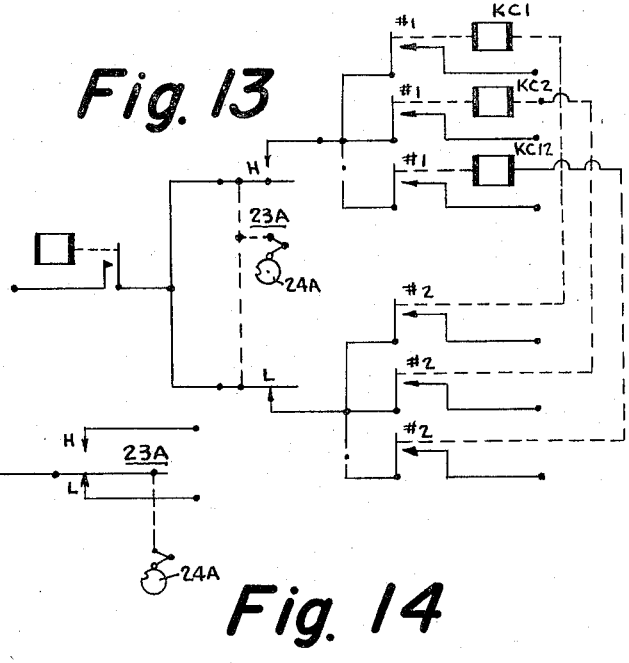

For installations in which all measuring points have a common set point but additionally require knowledge of which point is in an alarmed condition, the control circuit arrangement of FIG. 13 provides the necessary commutated switching of load circuits which operate in unison with corresponding input-selection circuits. The relay contacts KC1–1 through KC12–1 of the control-commutator relays KC1–KC12 close as the recorder measures points $T_1$–$T_{12}$ respectively. If the measured value of any point, for example, $T_2$, is above the set-point, the H contact of set-point switch 23A will close. This closure, plus that of the KC2–1 contacts, and the interrupter contacts KE–1 establishes a circuit to the alarm device for point #2. This arrangement not only provides an alarm indication but also shows which point is alarmed. It is to be noted that in this arrangement the set-point switch is followed by the commutating contacts.

Figure 14:
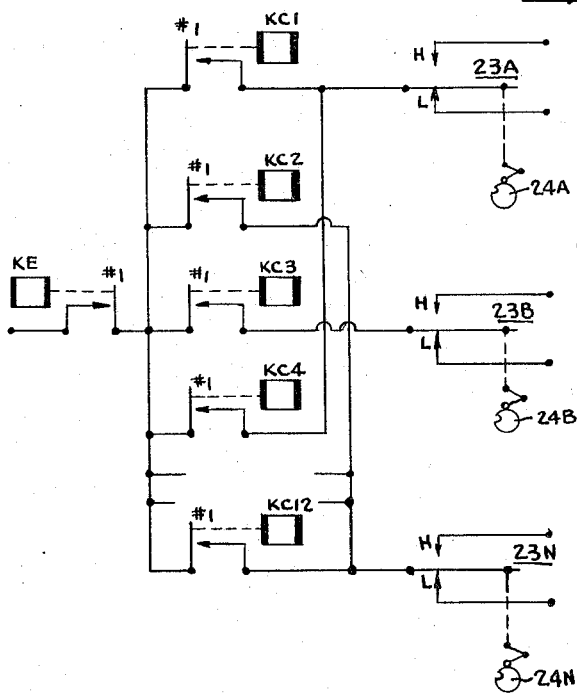

The arrangement shown in FIG. 14 is similar to that of FIG. 13 except that the commutating contacts are followed by the set-point switches 23A–23N. Specifically, in the arrangement of FIG. 14, three set-point switches are shown: switch 23A is for the common set-point of measuring points #1 and #4; switch 23B is for point #3 only; and switch 23N is for the common set-point of points #2 and #12. Many other combinations are possible.

Figure 15:
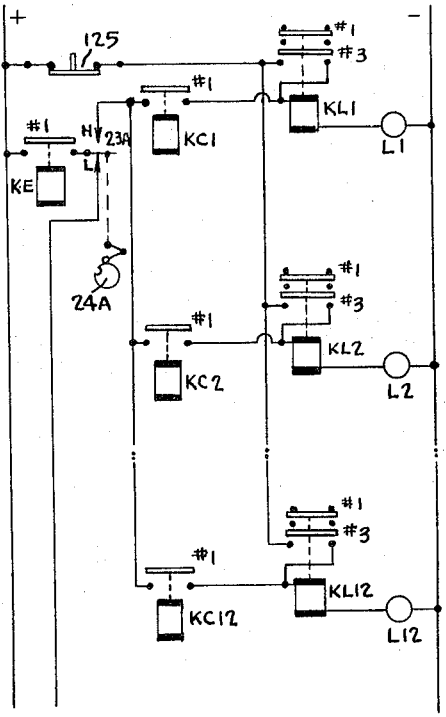

The arrangement of FIG. 15 includes that of FIG. 13 plus the lock-in relays KL1–KL12 which provide, when any point is alarmed, closure of an alarm circuit which remains closed until manually opened or reset. In operation, closure of the contacts H of set-point switch 23A, in conjunction with closure of a commutator contact, for example KC1–1, and interrupter contacts KE–1, causes energization of the coil of relay KL1. The resulting closure of contact KL1–3 provides current through the normally-closed reset switch 125 to the coil of relay KL1 even after the recorder has moved on to the next point. The KL1–1 and KL1–2 contacts are available to provide circuits for alarm indicators. The KL1 relay is reset or deenergized by momentary opening of reset switch 125. In FIG. 15, there is one reset switch 125 common to all hold-in circuits so that when opened, it will reset any and all relays which are locked in. If desired, however, there may be a reset switch for each hold-in circuit.

Figure 16:
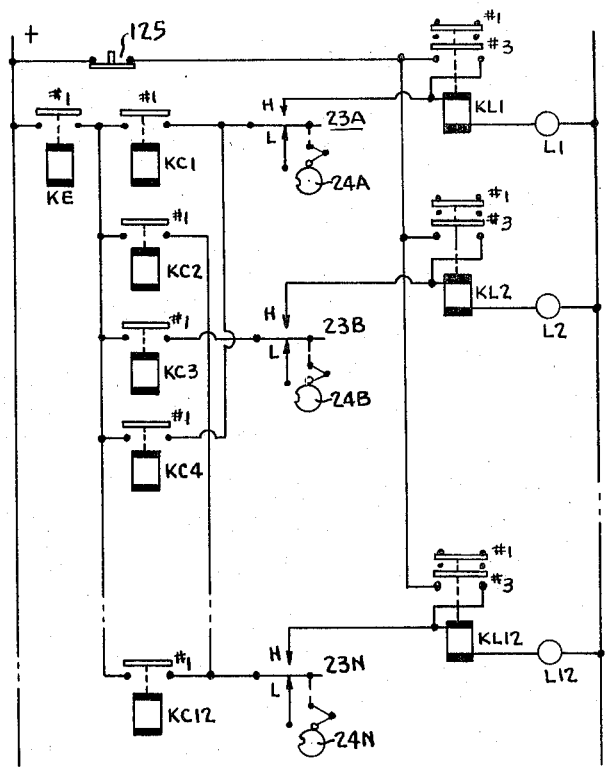

The arrangement shown in FIG. 16 is similar to FIG. 15 except that it includes the arrangement of set-point switches shown in FIG. 14.

Figure 17:
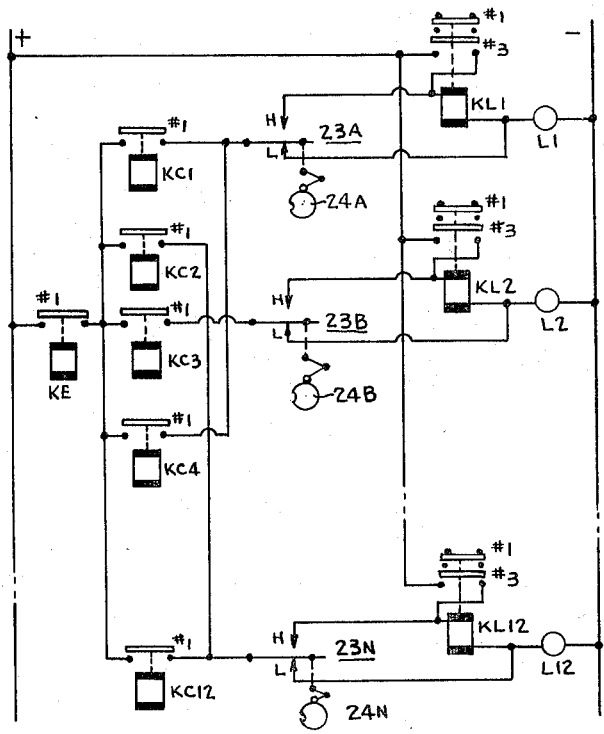

The arrangement shown in FIG. 17 is similar to that of FIG. 16 except that resetting of the lock-in relays KL1–KL12 is effected automatically instead of manually. For example, closure of the H contact of set-point switch 23A, in conjunction with closure of commutator contacts KC1–1 and interrupter contacts KE–1, causes energization of relay coil KL1. The resulting closure of its contacts KL1–3 maintains energization of relay KL1 even after the recorder has moved on to the next measuring point. The KL1–1 and KL1–2 contacts of the energized relay KL1 provide circuits for alarm indicators. If, when the recorder again switches to point #1, that point is still above set-point, the H contact of switch 23A, again closes and relay KL1 remains locked in. However, if point #1 is no longer above its set-point, the L contact of switch 23A will close and so short-circuit the KL1 relay coil through the contacts KC1–1 of commutator relay KC1 and interrupter contacts KE–1 of the interrupter relay. Accordingly, the KL1–3 contacts open to break the hold-in circuit of relay KL–1 and its alarm circuit contacts revert to their normal, non-alarmed position. The resistor L1 limits the current during reset.

Figure 18:
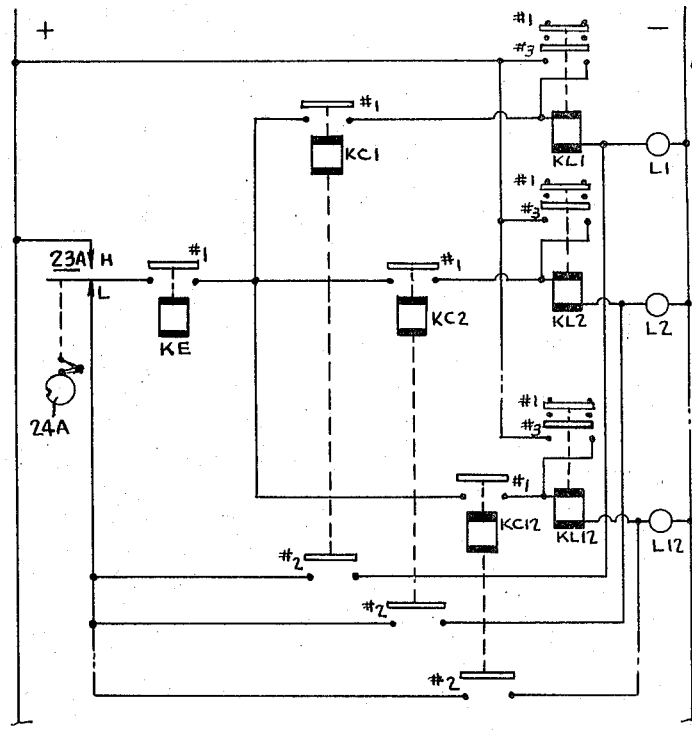

The arrangement of FIG. 18 provides automatic reset in control circuitry where the commutation follows the set-point switch. Closure of the H contact of switch 23A, in association with closure of control-commutator contacts, for example KC1–1, plus closure of interrupter contacts KE–1, causes the coil of lock-in relay KL1 to be energized. The resulting closure of its contacts KL1–3 completes the lock-in circuit of relay KL1 and it remains energized as the recorder switches to the next point. When the recorder again switches to the alarmed #1 point, the L contact of switch 23A closes if the alarm condition no longer exists and, in conjunction with closure of contacts KC1–1, KC1–2 of commutator realy KC1 and KE–1, causes the relay to be deenergized.

Figure 19:
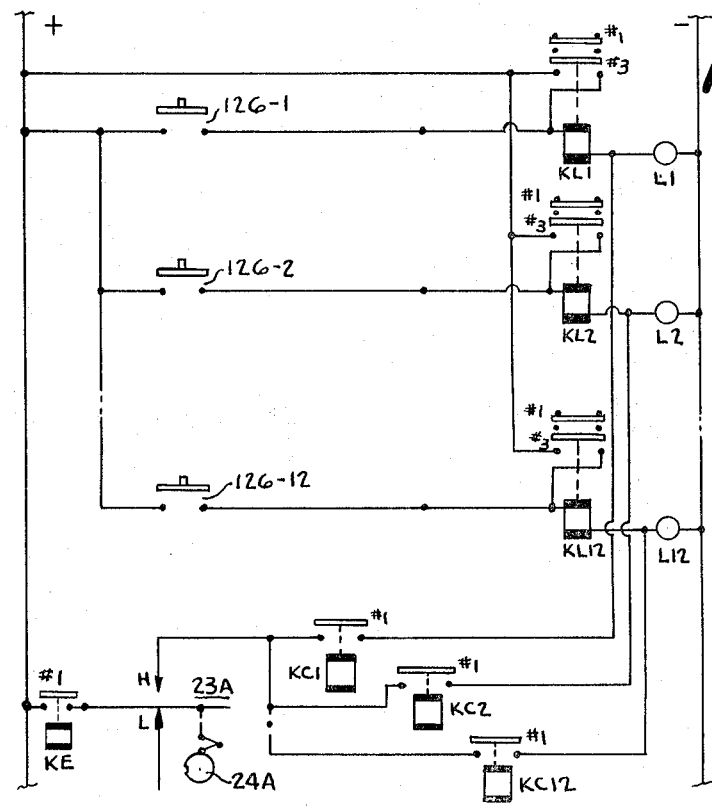
Figure 20:
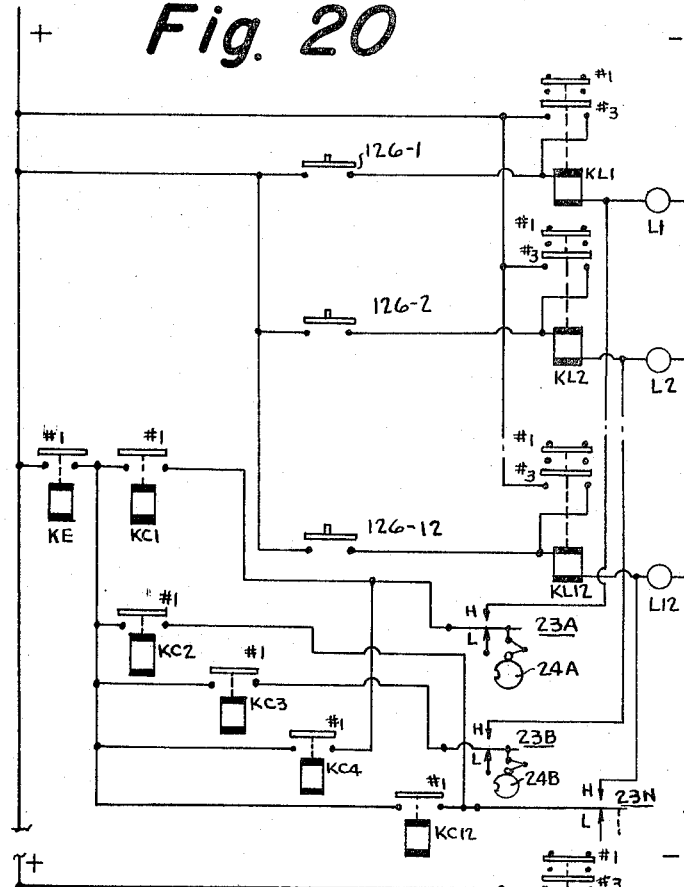
Figure 21:
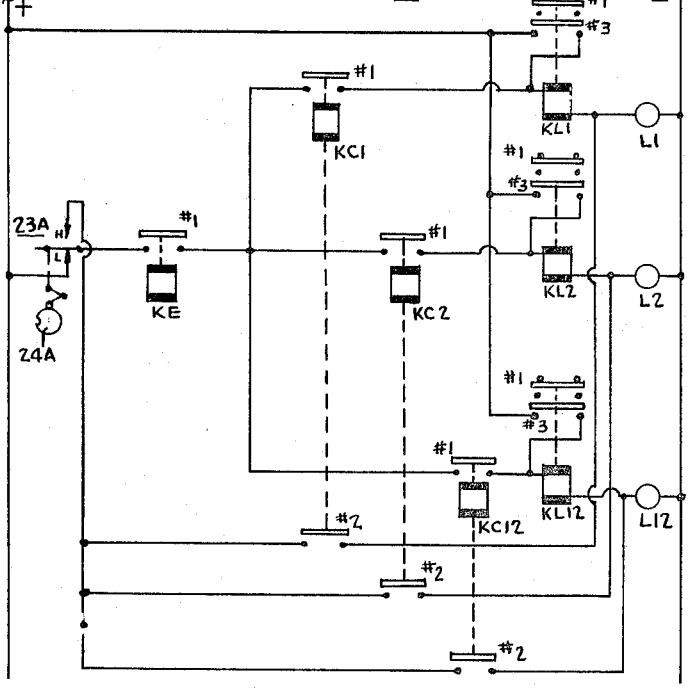
Figure 22:
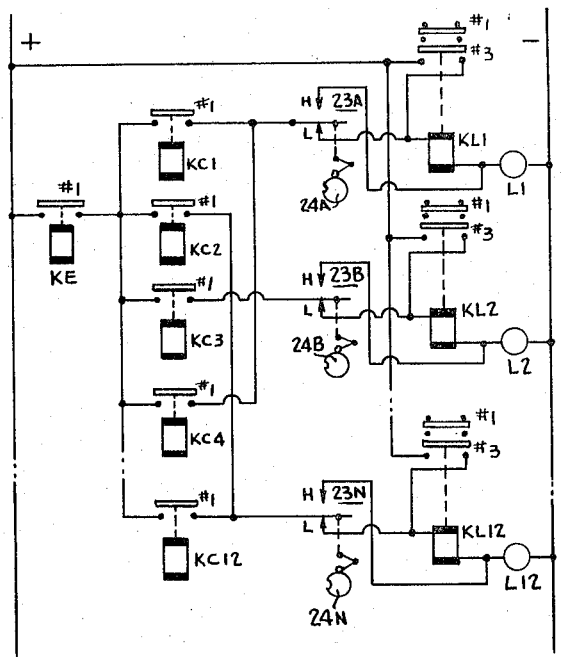

The arrangements of FIGS. 19–22 are respectively similar to FIGS. 15–18, except that the lock-in relays KL1–KL12 are normally energized and are deenergized for an alarm condition. In FIGS. 19 and 20, the lock-in relays are initially energized by momentary closure of the manually-operable switches 126–1 et seq.

With the manually-operable selector switch 55 (FIG. 1) interposed in cable 50 (either by permanent wiring or detachable plugs), and with cable plug 64 (FIGS. 4, 8) plugged into the "12-point" position (group 65, FIG. 4) of the input-selector relay card 60, the operator may switch to 12-point, 6-point, 4-point, 3-point, or 2-point operation by setting the knob 59 (FIGS. 1, 23B) to the corresponding point on switch dial 56. In addition, he may set the knob 59 to any of the point numbers 1 to 12 of the dial for continuous monitoring at the measuring point so selected. The rotating element of switch 55 is a disc (FIG. 23A) with a printed circuit pattern 57. Note that there are seventeen distinct angular segments in this pattern, corresponding to the seventeen numbers on the dial 56. Note also that there are thirteen concentric discontinuous rings on the pattern, corresponding to the twelve measuring points, and a common. The stationary elements of switch 55 are thirteen pairs of contacts, one pair on each ring, shown in FIG. 23A at the 6-point position on pattern 57 and illustrative of the connection made by the printed circuit to effect 6-point operation of the recorder. Note that at each of the seventeen segments of pattern 57, twelve incoming leads are sequentially connected to the common (by switch 11) but the circuit is completed by a particular segment of pattern 57, only to the desired output leads to plug 64.

The preferred construction of the synchronizing switch 11 of FIG. 1 is shown in FIGS. 24–26. The moving contact or brush 130 of this switch is secured to the insulating collar 131 which in turn is fastened to shaft 132 coupled to and continuously driven though gear train 12 (FIG. 1) from print-drive shaft pinion 30 of the recorder 10. The fixed point contacts #1–#12 of the switch are printed on the tabs 133 formed by the angularly spaced peripheral notches 134 of the disc of insulation 135. The thirteen terminal pins 136 extend through the disc 135; twelve of them are respectively connected as by soldering to the fixed contacts #1–#12 which are swept by the longer arm 130A of the contact brush 130; and the thirteenth is connected to fixed contact ring 137. These terminal pins are connected to the corresponding point conductors of cable 50. The short arm of the contact brush 130 is in continuous engagement with the fixed contact ring 137 printed on disc 135: its terminal is connected to the C conductor of cable 50.

As shown in FIG. 26, the lower edge of the longer movable contact arm 130A is wider than the spacing between adjacent fixed contacts. However, this lower edge is at an angle to the contact plane so that it never bridges the adjacent fixed contacts, for example #1 and #2. The trailing tip of the moving contact 130A remains in engagement with the rear fixed contact (#1) until the leading portion of contact 130A is over but spaced from the forward fixed contact (#2). During continued rotation of contact 130A, the trailing tip springs into the notch 134 between contacts #1 and #2. The shape of the back of the trailing tip of the moving contact 130A is such that it clears contact #1 as it springs into the notch 134. Thus, the circuit between contact #1 and the brush arm 130A is broken just before the leading portion of arm 130A engages contact #2 to establish its circuit. Such rapid break-before-make action of switch 11 precludes possibility of any undesirable concurrent energization of the selector-input relays and commutating relays.

By adding a second movable contact arm 138, insulated from bridging contact 130 and trailing the longer arm 130A thereof, an arc suppression circuit may be connected between the contacts 138, 130 to prevent switch arcing due, for instance, to the inductive relay coil circuit. The arc-suppression may be accomplished by a washer-shaped varistor 139 rotating with the movable contacts 130, 138 and electrically connected between them.

For thermocouple input circuits, it is necessary to use thermocouple extension leadwire from the thermocouple to the recorder measuring circuit. If a temperature difference existed between the input and the output of the input-selector 60 of FIG. 4, it would be necessary to use thermocouple extension leadwire for the conductors of the input-selector. In order to utilize ordinary copper conductors in the input-selector, thermocouple inputs to and outputs from the input-selector are connected at the input-selector terminal board 62 of FIG. 4. If the input-selector terminal board can be considered isothermal, no error will be introduced into the thermocouple signal due to using copper conductors in the input-selector. To maintain this isothermal condition, the contacts on either side of the terminal board are separated, not by a solid mass of insulation having low thermal conductivity, but by a bar of copper or high-thermal conductivity material covered with a thin strip or film of electrical insulating material, such as Teflon tape, to afford the necessary electrical insulation between terminals. This copper bar, in conjunction with the compact size of the input-selector terminal board 62 of FIG. 4, causes the input-selector terminal board to be relatively isothermal.

It shall be understood the invention is not limited to the preferred arrangements and constructions specifically disclosed but includes modifications and equivalents thereof within the scope of the appended claims. For example, the contacts of the interrupter relay may be included in the load circuit controlled by a lock-in relay rather than in the energizing circuit of that relay for the purpose of precluding change in the load circuit state before completion of rebalancing of said measuring circuit.

What is claimed is:

1. A recorder system comprising
   a multiple-point recorder having a self-balancing measuring circuit and a multi-point synchronizing switch rotating in synchronism with the print mechanism of the recorder,
   input-selector relays in number corresponding with the maximum point-recording capability of said recorder and having their coils respectively connected to corresponding points of said synchronizing switch for energization from a high-level source, each of said relays having contact means operable to connect said measuring circuit directly to input terminals for a measuring point through a low-level circuit excluding said synchronizing switch, and
   means for varying the number of recorded measuring points including a network in the high-level coil circuits of said selector relays and having different groups of terminals respectively corresponding with the number of selected relays to be sequentially energized per cycle of said synchronizing switch and the number of times each selected relay is to be energized during that cycle.

2. A recorder system as in claim 1 in which the last-named means includes a plug connector for connecting the points of said synchronizing switch to any selected one of the different terminal groups of said network.

3. A recorder system as in claim 1 in which said network and its terminal groups are provided by the contact pattern of a selector switch included in circuit between the points of said synchronizing switch and the coils of the corresponding input-selector relays.

4. A recorder system as in claim 1 in which the synchronizing switch is of break-before-make type affording rapid transfer substantially independent of rotational speed to preclude undesired concurrent energization of input-selector relay coils individually connected to adjacent points of said switch.

5. A recorder/controller system comprising
   a multiple-point recorder having a self-balancing measuring circuit, a multi-point synchronizing switch driven in synchronism with the print-mechanism of the recorder,
   input-selector relays having their coils respectively connected to corresponding points of said synchronizing switch and having contact means operable to connect said measuring circuit to the input terminals for measuring points,
   means including a network in the coil circuits of said selector relays for selecting the number of them energized per cycle of said synchronizing switch, and one or more commutator relays each connected for energization concurrently with a corresponding selector relay and having contact means for inclusion in a control circuit.

6. A recorder/controller system as in claim 5 additionally including an interrupter relay having contacts which jointly with contact means of said commutator relays control load circuits and which is energized in timed relation to the point-to-point advance of said synchronizing switch to preclude change of the load circuit state before completion of rebalancing of said measuring circuit.

7. A recorder/controller system as in claim 5 in which said network is provided with terminal groups respectively connected to different numbers of coils of the selector relays for selective engagement by a plug connector from all points of said synchronizing switch to predetermine which paired selector and commutator relays are energized per cycle of the synchronizing switch.

8. A recorder/controller system as in claim 5 in which said network is provided by the contact pattern of a selector switch which is included in circuit between the points of said synchronizing switch and the coils of the corresponding input-selector relays and which is operable to predetermine which paired selector and commutator relays are energized per cycle of the synchronizing switch.

9. A recorder/controller system as in claim 6 additionally including
one or more lock-in relays each having a contact operable upon energization of its coil for completion of a lock-in circuit including the relay coil, and
control circuits respectively controlling the energization and deenergization of the lock-in relay coil,
one of said control circuits including contacts of at least one of said commutator relays and a set-point switch of said recorder,
and the other of said control circuits including a manually-operable switch.

10. A recorder/controller system as in claim 6 additionally including
one or more lock-in relays each having a contact operable upon energization of its coil for completion of a lock-in circuit including the coil, and
control circuits respectively controlling the energization and deenergization of the lock-in relay coil,
one of said control circuits including contacts of one or more of said commutator relays and one side of the set-point switch of the recorder,
and the other of said control circuits including the other side of the set-point switch.

11. A recorder/controller system as in claim 6 additionally including
one or more lock-in relays having contact means operable upon energization of its coil for completion of a lock-in circuit including the coil,
an energizing circuit for the lock-in relay coil including one set of normally-open contacts of one of the commutator relays, normally-open set-point contacts of the recorder, and contacts of the interrupter relay, and
a deenergizing circuit for the lock-in relay coil comprising another set of normally-open contacts of said commutator relay.

12. A recorder/controller system as in claim 6 additionally including
one or more lock-in relays having contact means operable upon energization of its coil for completion of a lock-in circuit including the coil,
an energizing circuit for the lock-in relay coil including a manually-operable switch, and
a deenergizing circuit for the lock-in relay coil comprising normally-open contacts of one of said commutator relays, normally-open contacts of a set-point switch of the recorder, and contacts of the interrupter relay.

13. A recorder/controller system as in claim 6 additionally including
one or more lock-in relays having contact means operable upon energization of its coil for completion of a lock-in circuit including the coil,
an energizing circuit for the lock-in relay coil comprising normally-open contacts of a set-point switch of the recorder, normally-open contacts of at least one of said commutator relays, and contacts of the interrupter relay, and
a deenergizing circuit for the lock-in relay coil comprising the normally-closed contacts of said set-point switch.

14. A recorder/controller system as in claim 6 additionally including
one or more lock-in relays having contact means operable upon energization of its coil for completion of a lock-in circuit including the coil,
an energizing circuit for each lock-in relay comprising the normally-open contacts of a set-point switch of the recorder, normally-open contacts of the corresponding commutator relay, and contacts of the interrupter relay, and
a normally-closed manually-operable reset switch in the lock-in circuit.

15. A recorder/controller system as in claim 6 additionally including
a group of lock-in relays each having contact means operable upon energization of its coil for completion of a lock-in circuit including the coil,
energizing circuits for said lock-in relays comprising the normally-open contacts of a corresponding set-point switch of the recorder, and a normally-open contact of at least one commutator relay, and
a normally-closed manually-operable reset switch means for opening the lock-in circuits of said relays.

16. A recorder-controller system as in claim 6 additionally including
a group of lock-in relays each having contact means for completion of a lock-in circuit through its coil,
an energizing circuit for each lock-in relay comprising the normally-open contacts of the corresponding relay and the normally-open contacts of the corresponding set-point switch of the recorder, and
an automatic reset circuit for each lock-in relay comprising the normally-closed contacts of the corresponding set-point switch.

17. A recorder/controller system as in claim 6 additionally including
a group of lock-in relays having contact means for completion of a lock-in circuit through its coil,
an energizing circuit for such said relays comprising normally-open contacts of the correspnding commutator relay and the normally-open contacts of a set-point switch common to all of the energizing circuits, and
an automatic reset circuit for each of said lock-in relays comprising other normally-open contacts of the corresponding commutator relay and the normally-closed contacts of said set-point switch.

18. A recorder/controller system as in claim 6 additionally including
a group of lock-in relays having contact means for completion of a lock-in circuit through its coil,
normally-open manually-operable switches for initially energizing corresponding lock-in relays, and
an automatic unlock circuit for each of said lock-in relays comprising normally-open contacts of the corresponding commutator relay and the normally-open contacts of a set-point switch of the recorder.

19. A recorder/controller system as in claim 18 in which the reset circuits respectively include the normally-open contacts of different set-point switches each in circuit with the corresponding paired commutator and lock-in relays.

20. A recorder/controller system as in claim 6 additionally including
   a group of lock-in relays having contact means for completion of a lock-in circuit through its coil,
   an energizing circuit for each of said lock-in relays comprising normally-open contacts of the corresponding commutator relay and the normally-closed contacts of a recorder set-point switch common to all of the energizing circuits, and
   an automatic unlock circuit for each of said lock-in relays comprising other normally-open contacts of the corresponding commutator relay and the normally-open contacts of said set-point switch.

21. A recorder/controller system as in claim 6 additionally including
   a group of lock-in relays having contact means for completion of a lock-in circuit through its coil,
   energizing circuits for said lock-in relays comprising the normally-closed contacts of a corresponding set-point switch of the recorder, and a normally-open contact of at least one commutator relay, and
   an automatic unlock circuit for each of said lock-in relays comprising the normally-open contacts of one or more commutator relays, and the normally-open contacts of the associated set-point switch.

22. A recorder system comprising
   a recorder having a self-balancing measuring circuit and a rotating synchronizing switch,
   input-selector relays in number corresponding with the total number of measuring points and having their coils respectively connected to corresponding points of said synchronizing switch, each of said relays having contact means operable to connect said measuring circuit directly to input terminals for a measuring point through a circuit excluding said synchronizing switch, and
   means for selectively varying the number of recorded measuring points and including a network in the coil circuits of said selector relays, said network having different groups of terminals respectively corresponding with the number of said relays to be energized per cycle of said synchronizing switch, the number of terminals for each of said different groups matching the total number of points of said synchronizing switch.

23. A recorder system as in claim 1 including, in circuit between the synchronizing switch and the input-selector relays, a selector switch comprising a printed-circuit contact pattern selectively providing different multi-point programming of the recorder.

24. A recorder system as in claim 4 in which the synchronizing switch comprises
   an insulating wafer having angularly spaced notches inwardly of its periphery to provide intervening tabs in number corresponding with the measuring points of the recorder,
   contacts on said tabs, and
   a relatively movable spring contact for sweeping over said tab contacts, said contact structure being inclined upwardly from the plane of engagement with said measuring point contacts in the direction of sweep, and being of width greater than the notch width so to provide a rapid break-before-make as the trailing end of said movable contact drops into the notch between successively swept tab contacts.

References Cited by the Examiner
UNITED STATES PATENTS

| | | | |
|---|---|---|---|
| 2,743,986 | 5/1956 | Bradner | 346—62 |
| 2,815,500 | 12/1957 | Hance et al. | 346—34 |
| 2,899,258 | 8/1959 | Spracklen | 346—45 |
| 3,034,125 | 5/1962 | Gonzenbach | 346—45 |
| 3,200,404 | 8/1965 | Ott | 346—62 |

RICHARD B. WILKINSON, *Primary Examiner.*

J. G. MURRAY, *Assistant Examiner.*

UNITED STATES PATENT OFFICE
CERTIFICATE OF CORRECTION

Patent No. 3,295,140            December 27, 1966

Kenneth B. Parker, Jr., et al.

It is hereby certified that error appears in the above numbered patent requiring correction and that the said Letters Patent should read as corrected below.

Column 4, line 9, for "KL2" read -- KC2 --; column 5, line 19, for "of", first occurrence, read -- to --; column 6, line 29, for "ciruits" read -- circuits --; column 8, line 36, after "23A" strike out the comma; line 59, for "realy" read -- relay --; column 9, line 23, for "thorugh" read -- through --; column 12, line 52, for "such" read -- each of --.

Signed and sealed this 25th day of June 1968.

(SEAL)
Attest:

Edward M. Fletcher, Jr.
Attesting Officer

EDWARD J. BRENNER
Commissioner of Patents